United States Patent
Kazakov et al.

(10) Patent No.: US 12,462,186 B2
(45) Date of Patent: Nov. 4, 2025

(54) STACKED DIES FOR MACHINE LEARNING ACCELERATOR

(71) Applicant: Advanced Micro Devices, Inc., Santa Clara, CA (US)

(72) Inventors: Maxim V. Kazakov, San Diego, CA (US); Swapnil P. Sakharshete, San Diego, CA (US); Milind N. Nemlekar, San Diego, CA (US); Vineet Goel, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 985 days.

(21) Appl. No.: 17/129,739

(22) Filed: Dec. 21, 2020

(65) Prior Publication Data

US 2021/0374607 A1 Dec. 2, 2021

Related U.S. Application Data

(60) Provisional application No. 63/031,954, filed on May 29, 2020.

(51) Int. Cl.
| | | |
|---|---|---|
| *G06N 20/00* | (2019.01) | |
| *G06F 12/0893* | (2016.01) | |
| *G06F 13/16* | (2006.01) | |
| *G06F 13/28* | (2006.01) | |
| *G06F 13/40* | (2006.01) | |
| *G06T 15/00* | (2011.01) | |
| *H01L 25/065* | (2023.01) | |

(52) U.S. Cl.
CPC ......... *G06N 20/00* (2019.01); *G06F 12/0893* (2013.01); *G06F 13/1668* (2013.01); *G06F 13/28* (2013.01); *G06F 13/4027* (2013.01); *G06T 15/005* (2013.01); *H01L 25/0657* (2013.01)

(58) Field of Classification Search
CPC ..... G06N 20/00; G06F 12/0893; G06F 13/28; G06F 13/1668; G06F 13/4027; H01L 25/0657
See application file for complete search history.

(56) References Cited

U.S. PATENT DOCUMENTS

| | | | |
|---|---|---|---|
| 10,268,395 B1 * | 4/2019 | Joshua | .............. G06F 3/0659 |
| 2005/0102657 A1 | 5/2005 | Lewis | |
| 2010/0228941 A1 | 9/2010 | Koob et al. | |
| 2015/0379670 A1 | 12/2015 | Koker et al. | |
| 2018/0157970 A1 | 6/2018 | Henry et al. | |
| 2019/0042477 A1 * | 2/2019 | Chhabra | .............. G06F 21/78 |

(Continued)

FOREIGN PATENT DOCUMENTS

| | | |
|---|---|---|
| CN | 1391671 A | 1/2003 |
| JP | 2017517810 A | 6/2017 |

(Continued)

*Primary Examiner* — Baboucarr Faal
(74) *Attorney, Agent, or Firm* — Volpe Koenig (57) ABSTRACT

A device is disclosed. The device includes a machine learning die including a memory and one or more machine learning accelerators; and a processing core die stacked with the machine learning die, the processing core die being configured to execute shader programs for controlling operations on the machine learning die, wherein the memory is configurable as either or both of a cache and a directly accessible memory.

20 Claims, 7 Drawing Sheets

(56) References Cited

U.S. PATENT DOCUMENTS

| | | |
|---|---|---|
| 2019/0042923 A1* | 2/2019 | Janedula ............... G06N 3/044 |
| 2019/0050040 A1 | 2/2019 | Baskaran et al. |
| 2019/0057300 A1 | 2/2019 | Mathuriya et al. |
| 2019/0073312 A1 | 3/2019 | Hu et al. |
| 2019/0156187 A1 | 5/2019 | Dasari et al. |
| 2019/0287208 A1 | 9/2019 | Yerli |
| 2020/0042477 A1 | 2/2020 | Malladi |
| 2020/0050476 A1 | 2/2020 | Xu et al. |
| 2020/0065113 A1 | 2/2020 | Gutierrez |
| 2020/0379911 A1* | 12/2020 | Wanner ............... G06F 12/126 |
| 2021/0074059 A1 | 3/2021 | Ando |

FOREIGN PATENT DOCUMENTS

| | | |
|---|---|---|
| JP | 2020027613 A | 2/2020 |
| WO | 2019225734 A | 5/2021 |

* cited by examiner

STACKED DIES FOR MACHINE LEARNING ACCELERATOR

CROSS REFERENCE TO RELATED APPLICATION

This application claims the benefit of U.S. provisional application no. 63/031,954, entitled "STACKED DIES FOR MACHINE LEARNING ACCELERATOR," filed on May 29, 2020, which is incorporated by reference as if fully set forth herein.

BACKGROUND

Processor speed improvements have generally not been matched by memory bandwidth speed improvements. A wide variety of techniques have been used to compensate for this fact.

BRIEF DESCRIPTION OF THE DRAWINGS

A more detailed understanding can be had from the following description, given by way of example in conjunction with the accompanying drawings wherein.

DETAILED DESCRIPTION

A device is disclosed. The device includes a machine learning die including a memory and one or more machine learning accelerators; and a processing core die stacked with the machine learning die, the processing core die being configured to execute shader programs for controlling operations on the machine learning die, wherein the memory is configurable as either or both of a cache and a directly accessible memory.

Figure 1:
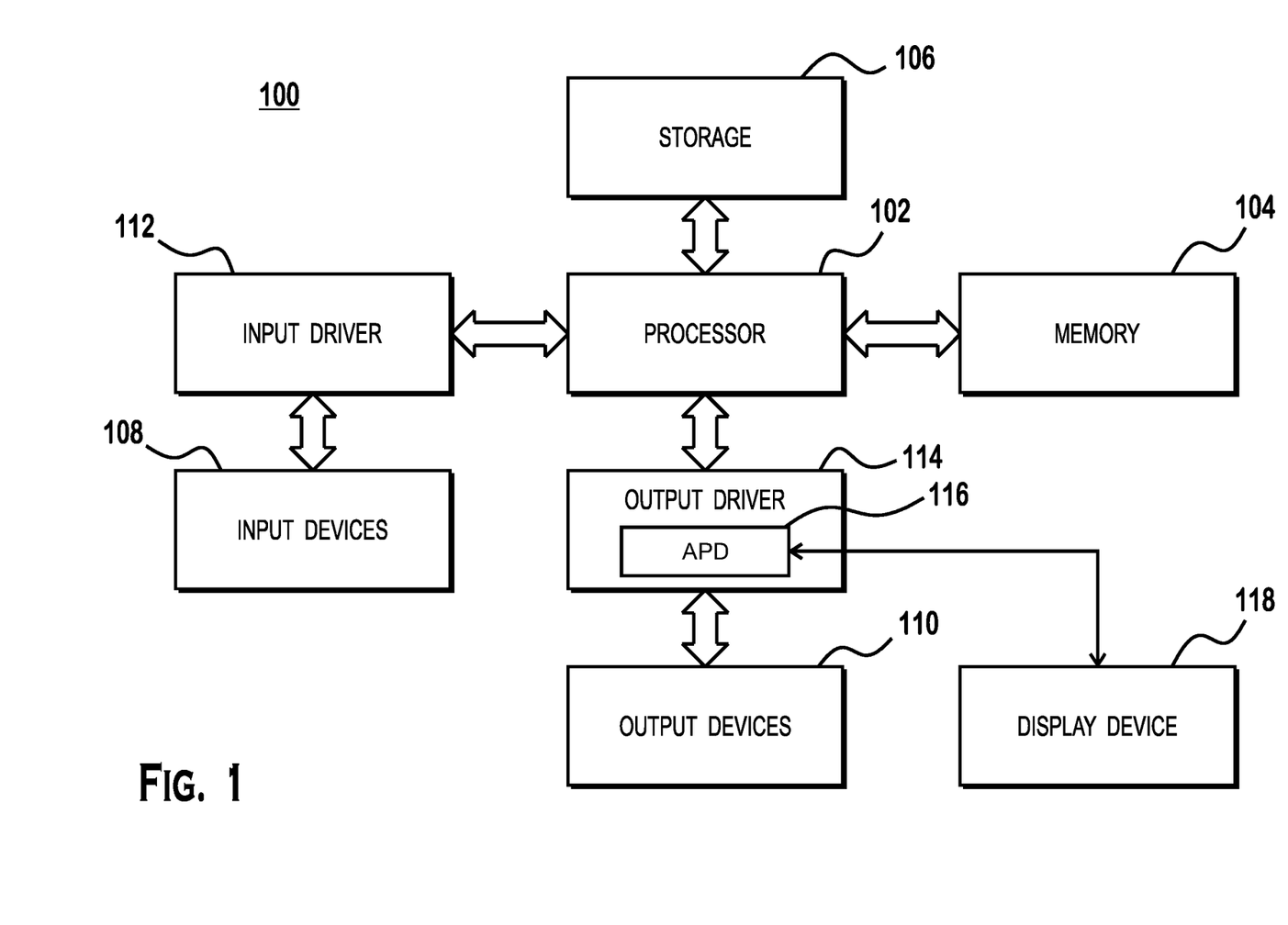
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116. In some implementations, the APD 116 is coupled to a display device 118, which, in some examples, is a physical display device or a simulated device that uses a remote display protocol to show output. The APD 116 is configured to perform machine learning related tasks. In some implementations, the APD 116 is configured to accept one or both of general purpose compute commands and graphics rendering commands from processor 102, to process those compute and graphics rendering commands, and, in some implementations, to provide pixel output to display device 118 for display.

In some implementations, the APD 116 includes one or more parallel processing units configured to perform computations in accordance with a single-instruction-multiple-data ("SIMD") paradigm. Although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2A:
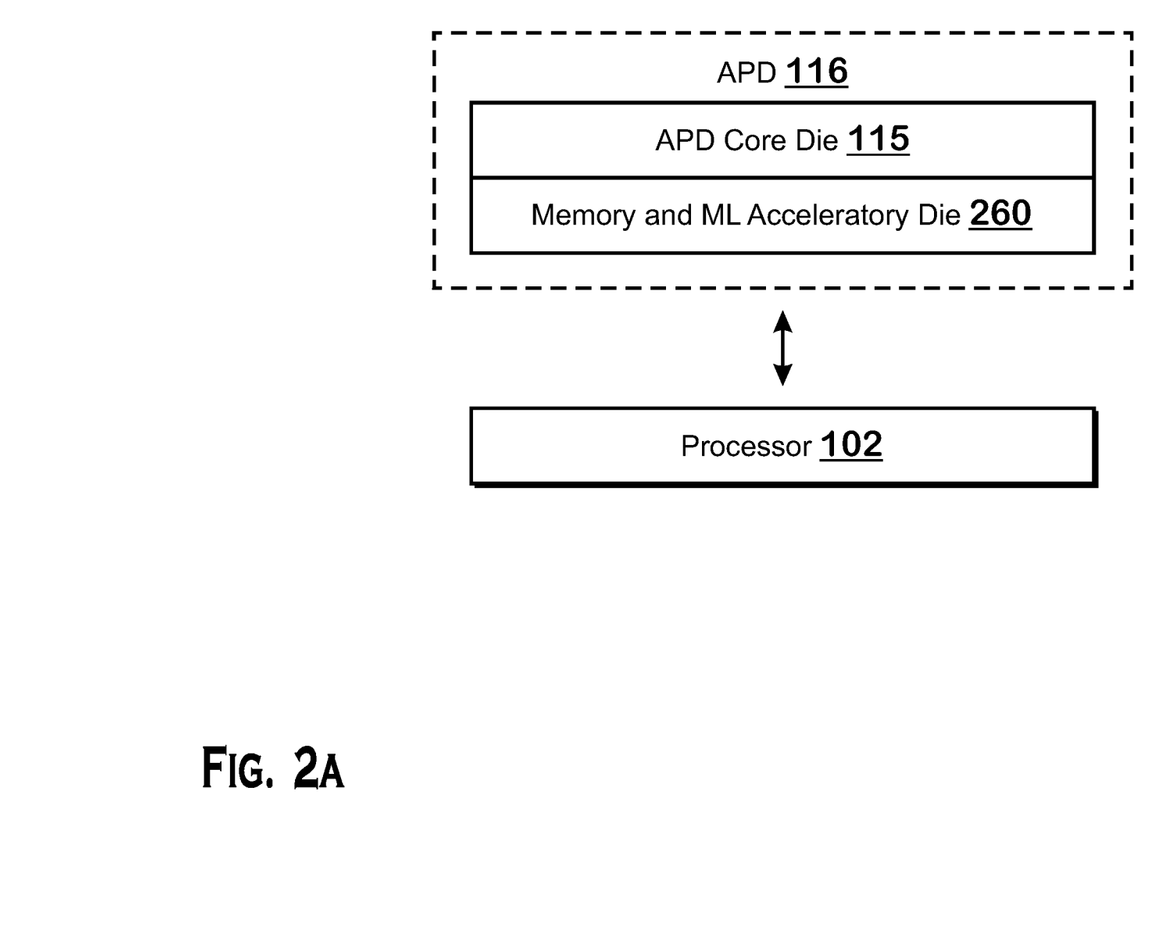
FIG. 2A illustrates details of the accelerated processing device of FIG. 1, according to an example.

FIG. 2A illustrates details of the APD 116, according to an example. The APD 116 has a stacked die configuration that includes an APD core die 115 and a memory and machine learning accelerator die 260. These dies are physically stacked, with one die on top of the other. The dies are operationally coupled via interconnects that allow transfer of data and commands. The memory and machine learning accelerator die 260 includes memory such as static random access memory and well as machine learning accelerators such as matrix multiplication arithmetic logic units ("ALUs") that are configured to perform matrix multiplication operations that may be useful for machine learning operations. The memory of the memory and machine learning accelerator die 260 is, in some implementations or modes of operation, used as a cache by the APD core die 115

Figure 2B:
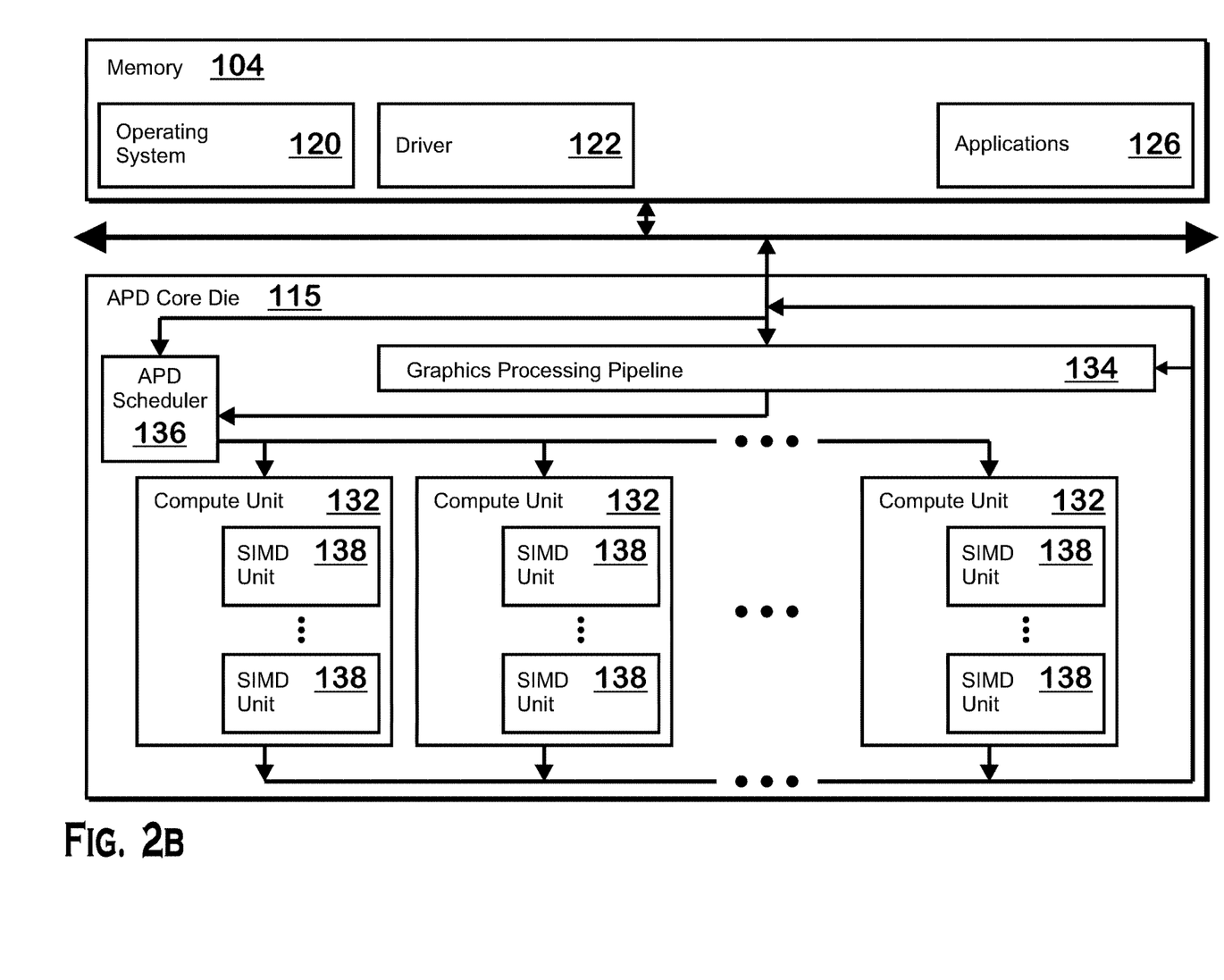
FIG. 2B illustrates details of the device and the accelerator processing device core die, according to an example.

FIG. 2B illustrates details of the device 100 and the APD core die 115, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The driver 122 controls operation of the APD core die 115, sending tasks such as graphics rendering tasks or other work to the APD core die 115 for processing. The driver 122 also includes a just-in-time compiler that compiles programs for execution by processing components (such as the SIMD units 138 discussed in further detail below) of the APD core die 115.

The APD core die 115 executes commands and programs for selected functions, such as graphics operations and non-graphics operations that may be suited for parallel processing. The APD core die 115 can be used for executing graphics pipeline operations such as pixel operations, geometric computations, and rendering an image to display device 118 based on commands received from the processor 102. The APD core die 115 also executes compute processing operations that are not directly related to graphics operations, such as operations related to video, physics simulations, computational fluid dynamics, or other tasks, based on commands received from the processor 102. In some examples, these compute processing operations are performed by executing compute shaders on the SIMD units 138.

The APD core die 115 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Shader programs, such as compute shader programs, executing on the APD core die 115, are capable of requesting that the memory and machine learning accelerator die 260 perform machine learning-related operations. Examples of such operations include operations to move data into or out of the memory of the memory and ML accelerator die 260, or operations to perform ALU operations such as matrix multiplication, using data in the memory of the memory and ML accelerator die 260 as operands.

It should be noted that although the APD core die 115 of FIG. 2B includes a graphics processing pipeline 134 and performs graphics operations, it should be understood that the teachings of the present disclosure could be used in conjunction with an APD core die 115 that does not include a graphics processing pipeline 134, but does include the compute units 132 and therefore is able to execute shader programs.

Figure 3:
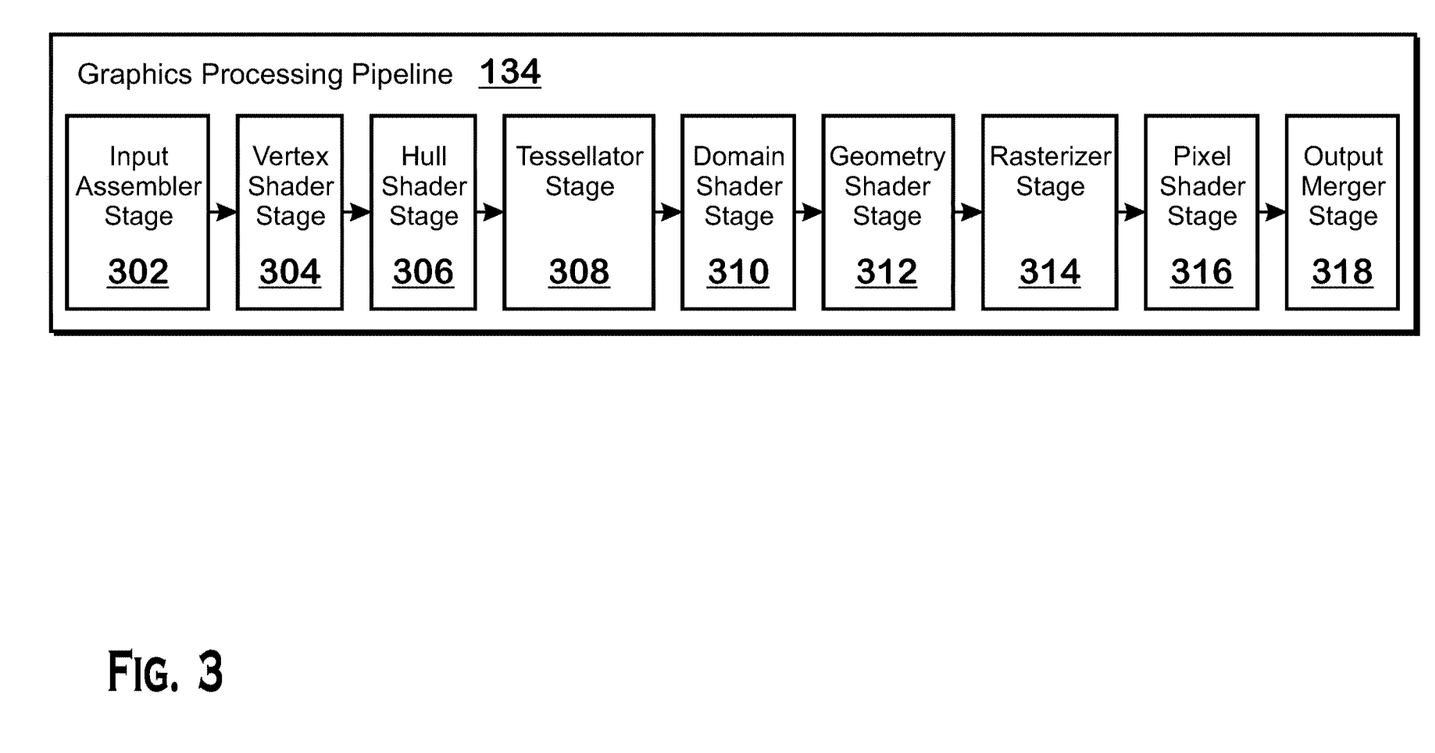
FIG. 3 is a block diagram showing additional details of the graphics processing pipeline illustrated in FIG. 2B, according to an example.

FIG. 3 is a block diagram showing additional details of the graphics processing pipeline 134 illustrated in FIG. 2B, according to an example. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132 that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a target surface, performing operations such as z-testing and alpha blending to determine the final color for the screen pixels. A target surface is the eventual target for a frame of the rendering operations within the graphics processing pipeline 134. The target surface may be at any location in memory (such as within a memory of the APD 116, or in memory 104).

Figure 4:
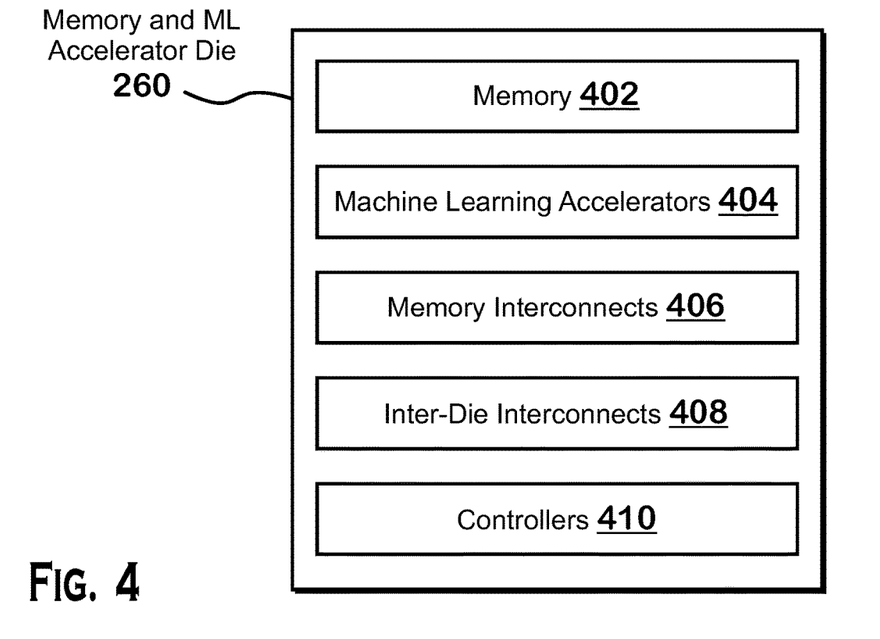
FIG. 4 is a diagram of the memory and machine learning accelerator die, according to an example.

FIG. 4 is a diagram of the memory and machine learning accelerator die 260, according to an example. The memory and machine learning accelerator die 260 includes memory 402, machine learning accelerators 404, memory interconnects 406, inter-die interconnects 408, and controllers 410.

In some examples, the memory 402 is a cache memory (such as a level 3 cache memory) that serves as a cache for the APD core die 115 (such as for the compute units 132). However, in certain configurations, at least a portion of the memory 402 is used directly for operations performed on the machine learning accelerators 404. The machine learning accelerators 404 include hardware accelerators for performing operations associated with machine learning. An example of such operations includes matrix multiplication operations.

In some modes of operations, the APD core die 115 executes shader programs associated with machine learning. The shader programs include instructions for configuring the memory 402 to be used directly for operations performed on the machine learning accelerators 404. The shader programs also include instructions for storing data into such memory. The shader programs also include instructions for causing the machine learning accelerators 404 to perform machine learning operations on the data stored in the memory. When the APD core die 115 encounters such instructions, the APD core die 115 instructs the memory 402 to load the data and instructs the machine learning accelerators 404 to perform the requested operations.

The memory interconnects 406 couple different portions of the memory 402 together and to the machine learning accelerators 404 so that the machine learning operations can be performed by the machine learning accelerators 404 on data stored throughout the memory 402. The inter-die interconnects 408 communicate data and commands between the memory and machine learning accelerator die 260 and the APD core die 115, as well as the processor 102. In some examples, the inter-die interconnects 408 are coupled directly to compute units 132 of the APD core die 115. The controllers 410 control operations on the memory and machine learning accelerator die 260, such as data transfer and machine learning operations on the machine learning accelerators 404.

Figure 5:
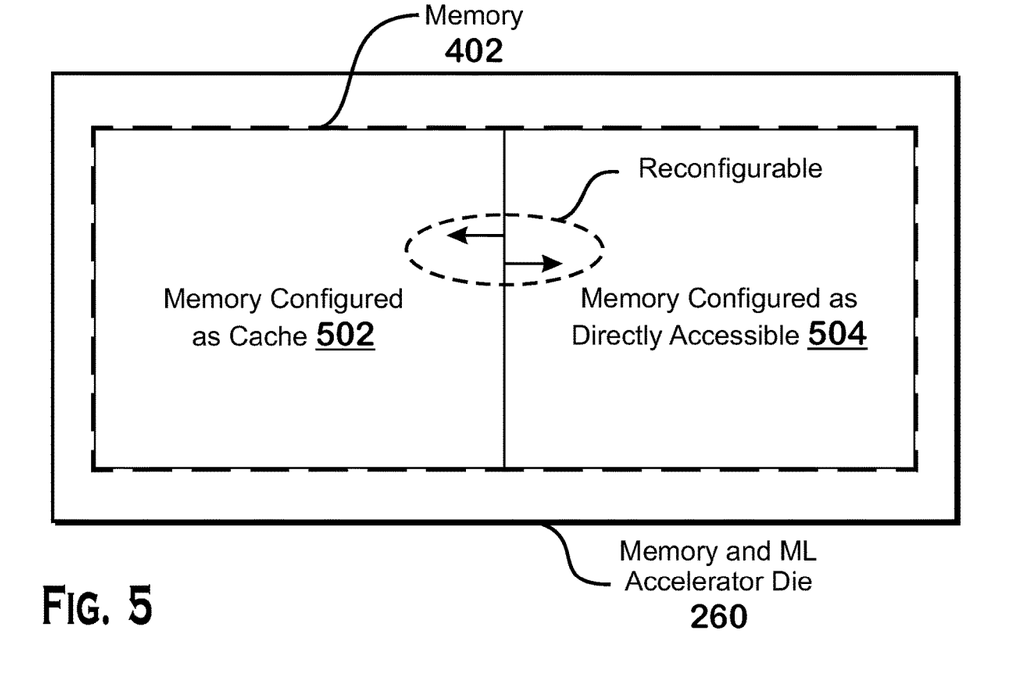
FIG. 5 illustrates reconfiguration of the memory between memory configured as a cache and memory configured as being directly accessible, according to an example.

FIG. 5 illustrates reconfiguration of the memory 402 between memory configured as a cache 502 and memory configured as being directly accessible 504, according to an example. At the request of a shader program or other entity, the memory controllers 410 alter the amount of the memory 402 used as a cache 502 and the amount of memory configured as directly accessible 504. The amount of memory 402 used as a cache 502 and the amount of memory configured as directly accessible 504 is reconfigurable. In some configurations, the cache memory 502 is used for graphics operations (e.g., on the graphics processing pipeline 134), and the directly accessible memory 504 is used for machine learning operations.

Figure 6:
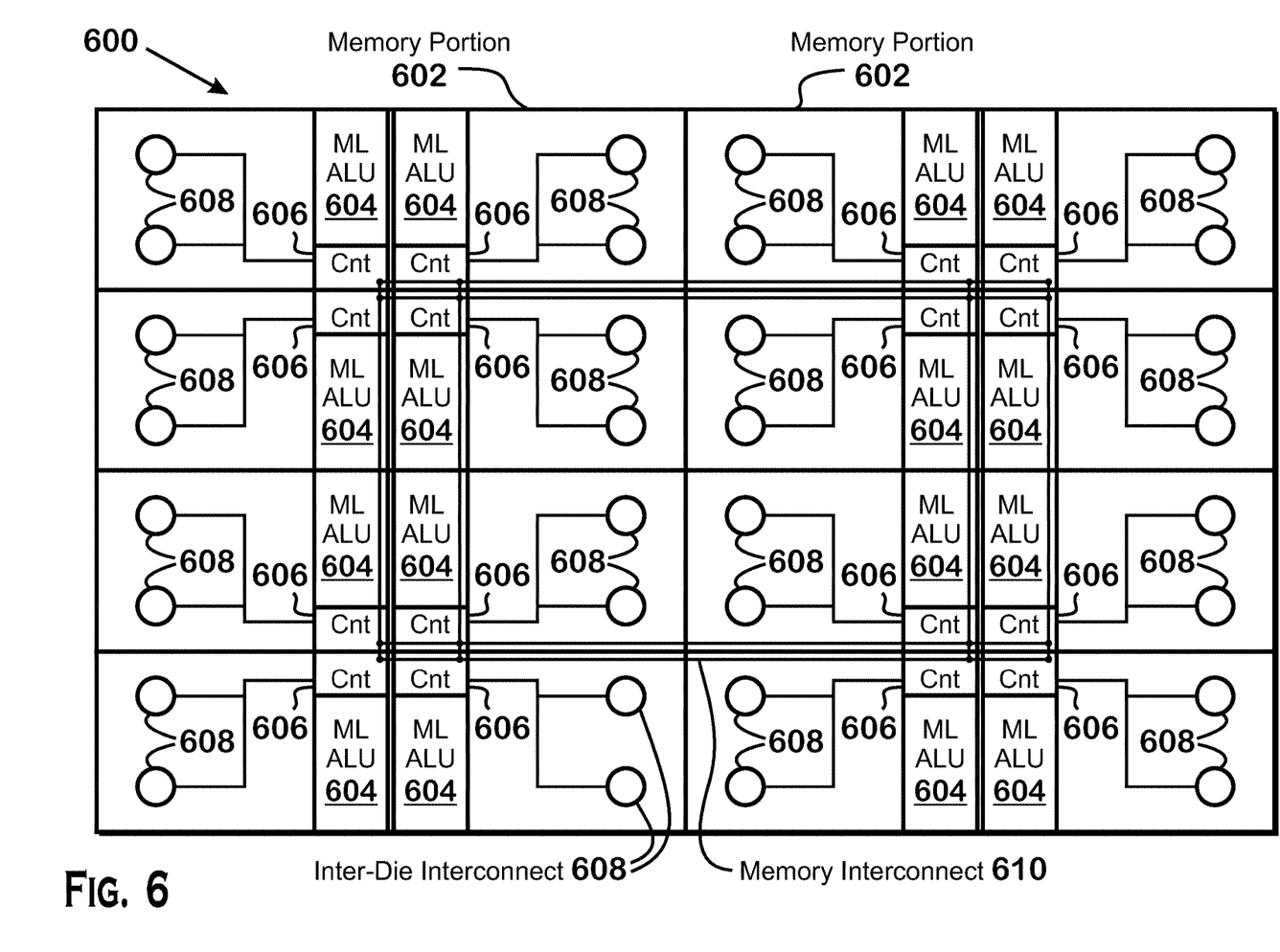
FIG. 6 illustrates an example layout for the memory and machine learning accelerator die.

FIG. 6 illustrates an example layout 600 for the memory and machine learning accelerator die 260. Large rectangles shown represent portions of memory 602. A number of machine learning arithmetic logic units ("ALUs") 604 are shown. Controllers ("Cnt") 606 are also shown adjacent the machine learning ALUs 604. A number of inter-die interconnects 608 are shown, coupled to the controller. A memory interconnect 610 couples the controllers 606 together.

The memory portions 602 are portions of a memory of the memory and machine learning accelerator die 260. These items represent portions of the total memory of the die 260 that are local to, and thus directly controlled by, a particular controller 606 and ML ALU 604. The inter-die interconnects 608 provide an external connection from the controllers 606. In various implementations, these inter-die interconnects 608 couple to either or both of the APD core die 115 or the processor 102. The controllers 606 communicate between the memory, ML ALU 604, and either or both of the APD core die 115 and processor 102 via the inter-die interconnects 608. The memory interconnect 610 is coupled to multiple controllers 606 and provides a communication link between those controllers 606. This link allows the controllers 606 to read from or write to memory portions 602 other than the memory portion local to the controller 606. In an example, the ML ALU 604 is capable of performing operations on data from different memory portions 602 by utilizing the memory interconnect 610.

Although various numbers of elements are shown in FIG. 6, it should be understood that a wide variety of implementations with different numbers of the illustrated elements are contemplated.

Although the present disclosure describes the memory and machine learning accelerator die being coupled to an APD die, in alternate implementations, the APD die is instead a microprocessor die.

Figure 7:
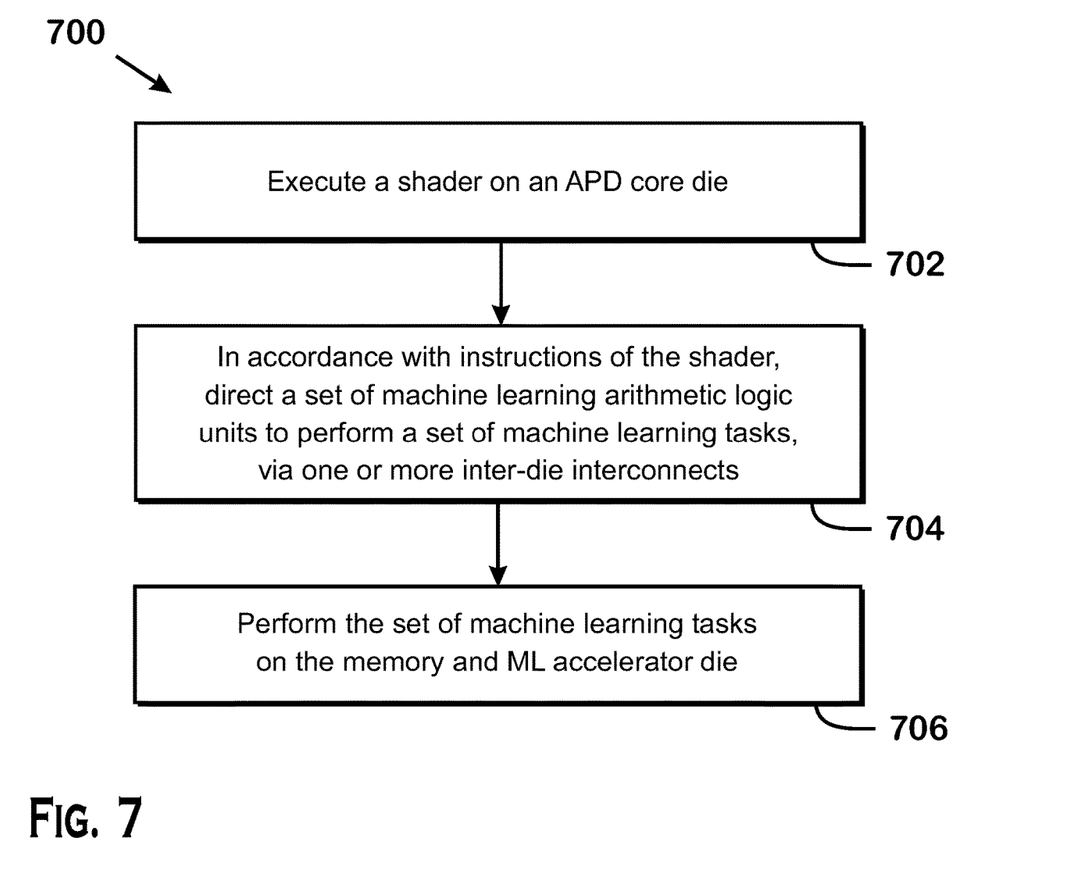
FIG. 7 is a flow diagram of a method for performing machine learning operations using a stacked machine learning and accelerator processing device, according to an example.

FIG. 7 is a flow diagram of a method 700 for performing operations with the APD 116, according to an example. Although described with respect to the system of FIGS. 1-6, those of skill in the art will understand that any system configured to perform the steps of the method 700 in any technically feasible order falls within the scope of the present disclosure.

The method 700 begins at step 702, where an APD core die 115 executes a shader. The shader includes instructions to perform machine learning operations using one or more ML ALUs 604.

At step 704, in accordance with the instructions of the shader, the APD core die 115 directs a set of machine learning ALUs 604 to perform a set of machine learning tasks. This direction occurs via one or more inter-die interconnects 608.

At step 706, the machine learning ALUs 604 perform the set of machine learning tasks. In various examples, a controller 606 receives communication from the APD core die 115 that includes information indicating which operations to perform and the controller 606 directs one or more ML ALUs 604 to perform the operations. In some examples, the controller 606 communicates with another controller 606 via a memory interconnect 610 to coordinate to perform the operations.

Each of the functional units illustrated in the figures represent hardware circuitry configured to perform the operations described herein, software configured to perform the operations described herein, or a combination of software and hardware configured to perform the steps described herein. A non-exclusive list of such units includes the storage 106, the processor 102, the output driver 114, the APD 116, the memory 104, the input driver 112, the input devices 106, the output devices 110, the display device 118, the operating system 120, the driver 122, the applications 126, the APD scheduler 136, the graphics processing pipeline 134, the compute units 132, the SIMD units 138, and any of the stages of the graphics processing pipeline 134.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A device, comprising:
   a machine learning die including a memory and one or more machine learning accelerators; and
   a processing core die stacked with the machine learning die, the processing core die being configured to execute shader programs for controlling operations on the machine learning die,
   wherein each machine learning accelerator is coupled to a local memory portion, to each other machine learning accelerator via a memory interconnect, and to the processing core die via an inter-die interconnect,
   wherein the memory is configurable as including both a cache and a directly accessible memory,
   wherein the memory includes a portion configured to switch between being used as a cache and being used as a directly accessible memory, wherein the switching comprises altering how much of the memory is used as the cache based on a specified amount; and
   wherein the cache is configured to perform caching operations for the processing core die and the directly accessible memory is configured to perform memory operations for the machine learning die.

2. The device of claim 1, wherein the machine learning accelerators are configured to perform matrix multiplication using data in the memory.

3. The device of claim 1, wherein the machine learning die and the processing core die are coupled via one or more inter-die interconnects.

4. The device of claim 1, wherein the processor core die is configured to modify a portion of the memory from being used for the one or more machine learning accelerators to being used as a cache for the processor core die.

5. The device of claim 1, wherein the processor core die is configured to modify a portion of the memory from being used as a cache for the APD core die to being used for the one or more machine learning accelerators.

6. The device of claim 1, wherein the processor core die is configured to execute shader instructions for storing data into the memory.

7. The device of claim 1, wherein the machine learning die further includes one or more controllers that control operations of the memory and the machine learning accelerators.

8. The device of claim 7, wherein the machine learning die further includes memory interconnects that couple the one or more controllers together.

9. The device of claim 8, wherein the memory interconnects are configured to provide data from one portion of the memory to a controller local to a different portion of the memory.

10. A method, comprising:
executing a shader program on an accelerated processing device ("APD") core die;
in accordance with instructions of the shader program, directing a set of machine learning ("ML") arithmetic logic units ("ALUs") of an ML accelerator die to perform a set of machine learning tasks, via one or more inter-die interconnects, wherein the ML accelerator die includes a memory, wherein the ML accelerator die is stacked with the APD core die, wherein the ML accelerator die includes one or more machine learning accelerators, and wherein each machine learning accelerator is coupled to a local memory portion, to each other machine learning accelerator via a memory interconnect, and to the APD core die via an inter-die interconnect,;
performing the set of machine learning tasks with ML ALUs; and
configuring the memory as both a cache and a directly accessible memory, wherein the cache is configured to perform caching operations for the APD core die and the directly accessible memory is configured to perform memory operations for the machine learning die, wherein the memory includes a portion configured to switch between being used as a cache and being used as a directly accessible memory, wherein the switching comprises altering how much of the memory is used as the cache based on a specified amount.

11. The method of claim 10, wherein the machine learning accelerators are configured to perform matrix multiplication using data in the memory.

12. The method of claim 10, wherein the machine learning die and the APD core die are coupled via one or more inter-die interconnects.

13. The method of claim 10, wherein the APD core die is configured to modify a portion of the memory from being used for the one or more machine learning accelerators to being used as a cache for the APD core die.

14. The method of claim 10, wherein the APD core die is configured to modify a portion of the memory from being used as a cache for the APD core die to being used for the one or more machine learning accelerators.

15. The method of claim 10, wherein the APD core die is configured to execute shader instructions for storing data into the memory.

16. The method of claim 10, wherein the machine learning die further includes one or more controllers that control operations of the memory and the machine learning accelerators.

17. The method of claim 16, wherein the machine learning die further includes memory interconnects that couple the one or more controllers together.

18. The method of claim 17, wherein the memory interconnects are configured to provide data from one portion of the memory to a controller local to a different portion of the memory.

19. A device, comprising:
a processor; and
an accelerated processing device ("APD") including:
a machine learning die including a memory and one or more machine learning accelerators; and
a processing core die stacked with the machine learning die, the processing core die being configured to execute shader programs for controlling operations on the machine learning die, one or more of the shader programs being specified by the processor,
wherein each machine learning accelerator is coupled to a local memory portion, to each other machine learning accelerator via a memory interconnect, and to the processing core die via an inter-die interconnect,
wherein the memory is configurable as including both a cache and a directly accessible memory,
wherein the memory includes a portion configured to switch between being used as a cache and being used as a directly accessible memory, wherein the switching comprises altering how much of the memory is used as the cache based on a specified amount; and
wherein the cache is configured to perform caching operations for the processing core die and the directly accessible memory is configured to perform memory operations for the machine learning die.

20. The device of claim 19, wherein the machine learning accelerators are configured to perform matrix multiplication using data in the memory.

* * * * *